United States Patent [19]
Pan

[11] Patent Number: 5,740,288
[45] Date of Patent: Apr. 14, 1998

[54] VARIABLE POLARIZATION BEAM SPLITTER, COMBINER AND MIXER

[75] Inventor: Jing-Jong Pan, Milpitas, Calif.

[73] Assignee: E-Tek Dynamics, Inc., San Jose, Calif.

[21] Appl. No.: 818,369

[22] Filed: Mar. 14, 1997

Related U.S. Application Data

[63] Continuation of Ser. No. 406,212, Feb. 22, 1995, abandoned.
[51] Int. Cl.$^6$ .............................. G02B 6/00; G02F 1/1335
[52] U.S. Cl. .............................. 385/11; 385/16; 385/34; 349/196
[58] Field of Search .............................. 385/11, 15, 16, 385/36, 39, 40, 33, 34; 349/196–198

[56] References Cited

U.S. PATENT DOCUMENTS

| | | | |
|---|---|---|---|
| 4,478,494 | 10/1984 | Soref | 349/196 |
| 4,702,557 | 10/1987 | Beckmann et al. | 349/197 |
| 4,948,229 | 8/1990 | Soref | 385/16 |
| 4,959,540 | 9/1990 | Fan et al. | 385/39 |
| 5,111,321 | 5/1992 | Patel | 349/198 |
| 5,414,541 | 5/1995 | Patel et al. | 349/196 |
| 5,477,350 | 12/1995 | Riza et al. | 385/16 |

*Primary Examiner*—Akm E. Ullah
*Assistant Examiner*—Hemang Sanghavi
*Attorney, Agent, or Firm*—Townsend and Townsend and Crew LLP

[57] ABSTRACT

Collimated light from two input fibers are directed against the interface of a beam splitter cube formed by two right-angle prisms. Light transmitted through, or reflected by, depends upon the polarization of the incoming light. A collimator subassembly for an output fiber receives light from the beam splitter cube. Polarization of the incoming light is controlled by orientation of the optical axes of one or two liquid crystal cells placed between each input fiber and beam splitter cube. By controlling the optical axes of the liquid crystal cells light from the two input fibers can be sent to the output fiber in any desired ratio. By rearranging the optical fibers, right-angle prisms and liquid crystal cells, a variable polarization beam combiner can be formed. A combination of the variable polarization beam combiner and beam splitter provides a variable polarization beam mixer, in which two input light signals can be combined and then split into two different output signals by control of liquid crystal cells. Finally, birefringent crystals and laminated beam splitter plates may also be used for the right angle prisms.

24 Claims, 4 Drawing Sheets

VARIABLE POLARIZATION BEAM SPLITTER, COMBINER AND MIXER

This is a Continuation of application Ser. No. 08/406,212, filed Feb. 22, 1995, now abandoned, the disclosure of which is incorporated by reference.

BACKGROUND OF THE INVENTION

The present invention relates to optical fiber network device technology and, more particularly, to devices which can split or combine light signals responsive to the polarization of the light signals.

In modern fiberoptic telecommunications, more and more reliance is being placed on the state of polarization of light signals. Typically the polarization of the signal is used to help direct the signal along the fiberoptic network. Network components or devices which function based upon the polarization of the light signal include fiberoptic polarization tunable filters, depolarizers, binary polarization switch/modulators, polarization division multiplexers and many other polarization related fiberoptic components. All of these devices require fiberoptic variable polarization beam splitters and/or combiners.

Present polarization beam splitters and combiners have various problems. Splitting ratios cannot be selected for polarization-maintaining fiber couplers fabricated by thermal fusion processes. Mechanically tunable fiber couplers employing two polished polarization-maintaining fibers suffer from fabrication complexity, tuning difficulties and poor extinction ratios. An integrated optical polarization beam splitter using $LiNbO_3$ or III–V semiconductor substrates also possesses the shortcomings of high insertion loss, poor polarization extinction ratios, and limited operational spectral bandwidth.

The present invention also solves or substantially mitigates these problems by providing for polarization beam splitters and combiners with low residual loss, high polarization extinction ratios, high damage thresholds, low polarization-dependent loss, and excellent tunability and controllability.

SUMMARY OF THE INVENTION

The present invention provides for a variable polarization beam splitter receiving light signals from a first optical fiber and transmitting light signals to second and third optical fibers. The variable polarization beam splitter has a first collimator subassembly which holds an end of the first optical fiber in coaxial relationship with a first collimator, a second collimator subassembly which holds an end of the second optical fiber in coaxial relationship with a second collimator, and a third collimator subassembly which holds an end of the third optical fiber in coaxial relationship with a third collimator. A light directing means, such as a beam splitter cube, in front of the first collimator subassembly directs light from the first collimator subassembly toward the second collimator subassembly or third collimator subassembly depending upon the polarization of the light signal from the first collimator subassembly. One or two liquid crystal cells are interposed between the first collimator subassembly and the light directing means. The cells controllably rotate the polarization of light from the first collimator subassembly toward the directing means responsive to control signals so that light signals from the first optical fiber can be variably split into the second and third optical fibers.

The present invention also provides for a variable polarization beam combiner which receives light signals from first and second optical fibers and which transmits the light signals to a third optical fiber. The splitter has a first, second and third collimator subassemblies, each of which holds an end of the first, second and third fibers respectively in coaxial relationship with a collimator. A light directing means, such as a beam splitter cube, or more descriptively, a beam combiner cube, in front of the first collimator subassembly directs light from the first collimator subassembly toward the third collimator subassembly depending upon the polarization of the light signal from the first collimator subassembly. The light directing means is also located in front of the second collimator subassembly to direct light from the second collimator Subassembly toward the third collimator subassembly depending upon the polarization of the light signal from the second collimator subassembly. One or two liquid crystal cells are interposed between the first collimator subassembly and the directing means; the cell or cells controllably rotate the polarization of light from the first collimator subassembly toward the directing means responsive to control signals. One or two liquid crystal cells are also interposed between the second collimator subassembly and the directing means; the cell or cells controllably rotate the polarization of light from the second collimator subassembly toward the directing means responsive to control signals. Thus light from the first and second optical fibers can be controllably and variably combined into the third optical fiber.

Furthermore, the present invention also provides for a variable polarization beam mixer which combines the variable polarization beam combiner and variable beam splitter. The combiner portion of the mixer receives light signals from first and second optical fibers, each of which are connected to collimator subassemblies. A first directing means, such as a polarization cube combiner, directs light from the first optical toward a second light directing means, such as a polarization beam splitter, responsive to the polarization of the light from the first optical fiber. The first directing means directs light from the second optical fiber toward the second directing means responsive to the polarization of the light from the second optical fiber. The second light directing means directs the light from the first directing means toward a collimator subassembly for a third optical fiber or toward a collimator subassembly for a fourth optical fiber responsive to the polarization of the light signals from the first directing means. One or two liquid crystal cells are interposed between the first and second directing means. The cells controllably rotate the polarization of light from the first directing means toward the second directing means responsive to control signals. Thus the light signals from the first and second optical fibers can be controllably and variably split between the third and fourth optical fibers.

DETAILED DESCRIPTION OF PREFERRED EMBODIMENT(S)

The use of a pair of right angle prisms as a polarization beam splitter is known in the prior art. The face of the hypotenuse of one prism is bonded to the hypotenuse face of the second prism with special dielectric materials to form a polarizing beam splitter cube with an internal interface at an angle 45° to the external faces of the cube. Incoming light which travels perpendicularly to one of the external faces is transmitted through the interface or reflected at the interface 90° to the incoming light according to the polarization of the light. Light which is linearly polarized in the plane of incidence is transmitted through the cube. Light which is linearly polarized perpendicularly to the plane of incidence is reflected by the cube.

If the incoming light is linearly polarized, then the light is split according to the orientation of the polarization. If one or two half-wave plates are placed in front of the beam splitter to intercept the incoming light, then the orientation of the incoming polarized light can be controlled by the orientations of the plates.

Figure 1:
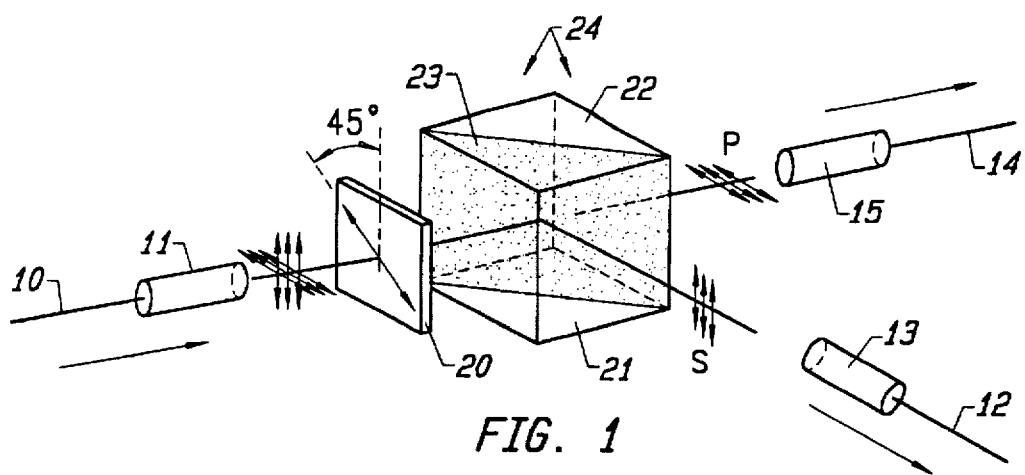
FIG. 1 is a perspective view of a variable polarization beam splitter according to one embodiment of the present invention.

The present invention generalizes this type of polarization beam splitter. FIG. 1 shows a variable polarization beam splitter according to one aspect of the present invention. The splitter is connected to an input optical fiber 10 and two output optical fibers 12 and 14. The end of the input fiber 10 terminates in a collimator subassembly 11 which directs the optical signals from the fiber 10 toward a liquid crystal cell 20.

The liquid crystal cell, depending upon the control signal imposed upon the cell, can rotate the polarization of the incoming light signal. Thus, the action of the cell 20 is such that polarized light from the input fiber 10 can be rotated after passing through the cell 20.

The beam splitter has a polarization beam splitter cube formed by two right-angle prisms 21 and 22, as explained above. Depending upon the state of polarization of the signal from the fiber 10, the cube 24 splits the input light into a P-component and an S-component. These two polarized and split beams are at 90° from each other. The P-component beam which passes straight through the cube 24 is linearly polarized in the plane of incidence at the interface. The S-component beam which emerges from the cube at right angles to the incident beam is linearly polarized orthogonal to the plane of incidence.

The two output fibers 12 and 14 are terminated by collimator subassemblies 13 and 15 respectively. Like the collimator subassembly 11 for the input fiber 10, each subassembly 13 and 15 holds the end of its respective optical fiber 12 and 14 in a coaxial relationship with a collimator, either a standard lens or a GRIN lens. While standard lenses could also be used as collimators, it has been found that quarter-pitch GRIN(GRaded INdex) lenses provide better performance, easier manufacturing and greater durability.

More detailed information on the manufacture of these GRIN lens/optical fiber subassemblies may be found in U.S. Pat. No. 5,208,876 entitled, "AN IMPROVED OPTICAL ISOLATOR", which issued on May 4, 1993 to J. J. Pan and assigned to the present assignee.

The front faces of the GRIN lens of each assembly 13 and 15 is arranged so that light reflected off the interface 23 is received by the GRIN lens collimator of the subassembly 13 and light transmitted through the interface 23 is received by the GRIN lens collimator of the subassembly 15. The subassembly 11 for the input fiber 10 faces the subassembly 15 for the output fiber 14, while the subassembly 13 for the output fiber 12 faces the interface 23 at a right angle to the line between the two subassemblies 11 and 15.

The surface of the cell 20 facing the first GRIN lens subassembly 11 is coated with anti-reflection coating for better performance. Further details of liquid crystal cell technology and its manufacture, which may used for the cell 20, may be found in U.S. Pat. No. 5,276,747, which issued Jan. 4, 1994 to J. J. Pan and assigned to the present assignee.

Thus, if the incident light from the input fiber 10 is polarized, the cell 20 can effectively direct the incident light into either one of the output fibers 12 and 14 or split the light in any desired ratio. Since the light received by the output fibers is polarized, polarization-maintaining fibers should be used for the fibers 12 and 14.

Figure 2:
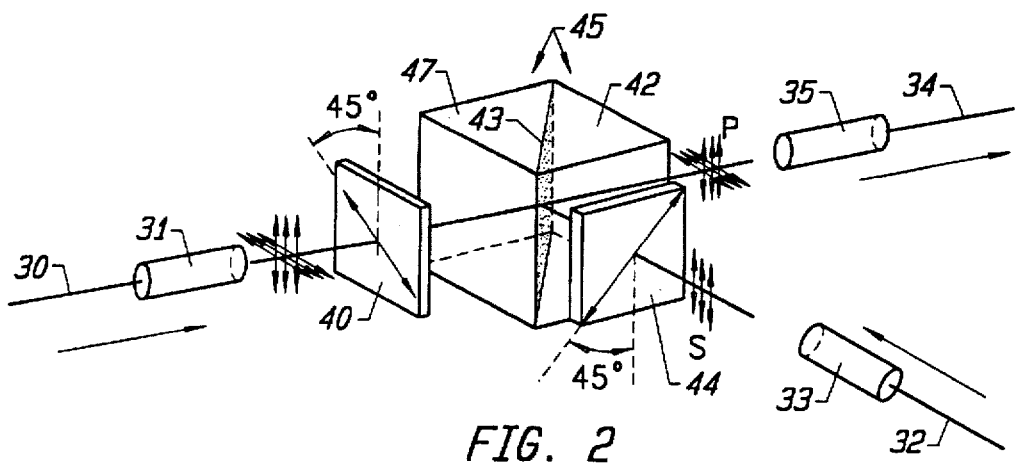
FIG. 2 is a perspective view of a variable polarization beam combiner according to the present invention.

The present invention also provides for a variable polarization beam combiner. FIG. 2 shows two input optical fibers 30 and 32, which are polarization-maintaining fibers. The ends of these fibers are respectively connected to collimator subassemblies 31 and 33, as described previously. Each of the subassemblies 31 and 33 faces a liquid crystal cell 40 and 44 respectively. The liquid crystal cells 40 and 44 each lie in front of one of the external faces of a beam splitter cube 45 formed by two right-angle prisms 41 and 42. The cell 40 lies in front of an external face belonging to the prism 41 and the cell 44 lies in front of an external face belonging to the prism 42. A collimator subassembly 35 for an output optical fiber 34, a single mode fiber, lies in front of the second external face of the prism 42 to be aligned with the collimator subassembly 31 and cell 40. The collimator subassembly 33 and cell 44 are arranged at a right angle to this alignment and on the same side of an interface 43 of the beam splitter cube 45 as the collimator subassembly 35 and the output optical fiber 34.

The collimated and polarized light from the input fiber 30 is directed to the normal face of the liquid crystal cell 40. As explained above, the cell 40 can rotate the polarization of the light. Similarly, the light from the input fiber 32 is directed against the normal front surface of the liquid crystal cell 44. The cell 44, likewise, can rotate the polarization of the incident light. The interface 43 of the cube 45 receives the light from the input fiber 30, after passing through the cell 40 and from the input fiber 32, which passes through the cell 44.

The cell 40 can controllaby rotate the polarization of the light from the input fiber 30 so that it strikes the interface 43 perpendicularly or parallel to the plane of incidence. Depending upon its polarization, the light can pass through the interface 43 or be blocked and reflected. Similarly, the liquid crystal cell 44 controls the polarization of the light from the input fiber 32 and collimator subassembly 33 so that the light can be blocked or reflected. The light which passes through the interface 43 from the input fiber 30 and which is reflected by the interface 43 from the input fiber 32 is directed and received by the collimator subassembly 35 which is connected to the output fiber 34. Hence, signals along the input fibers 30 and 32 may be combined in a desired ration or individually blocked from passing to the output fiber 34.

Figure 3:
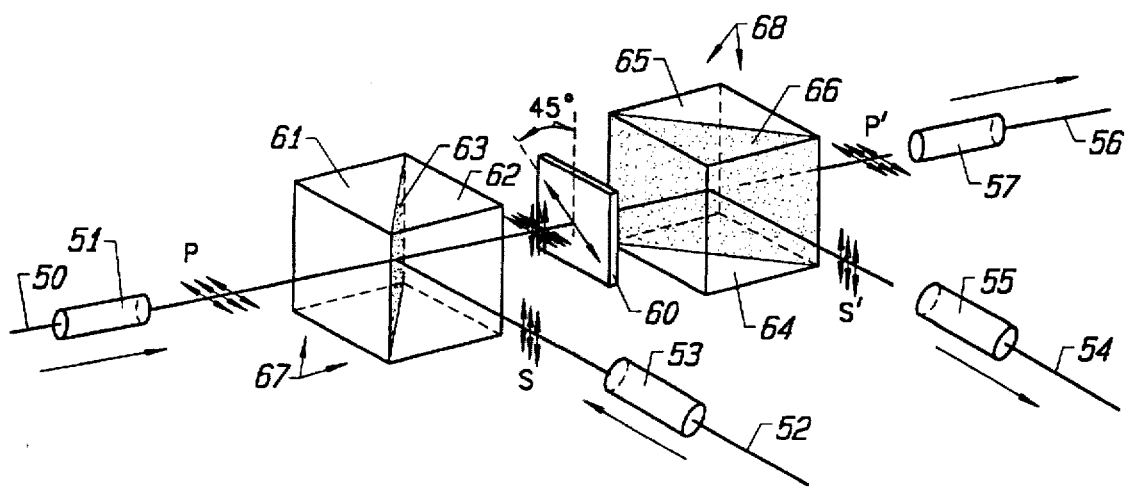
FIG. 3 is a perspective view of a variable polarization beam mixer according to the present invention.

FIG. 3 illustrates a variable polarization beam mixer which can combine and then split polarized light signals. The combiner portion of the mixer has two input optical fibers 50 and 52, which are polarization-maintaining fibers. The ends of these fibers 50 and 52 are respectively connected to collimator subassemblies 51 and 53. The light from the input fiber 50 and input fiber 53 are directed to an interface 63 of a polarization beam combiner cube 67. As described before, the combiner cube 67 is formed by two right-angle prisms 61 and 62. The light which passes through the interface 63 from the input fiber 50 and the light which is reflected by the interface 63 from the input fiber 52 is directed toward the normal face of a liquid crystal cell 60, which forms the beginning of the splitter portion of the mixer.

As described above, the cell 60 controllably rotates the polarization of the combined light from the combiner 67. After passing through the cell 60, the light is incident upon an interface 66 of a polarization beam splitter cube 68. The splitter cube 68 is formed by two right-angle prisms 64 and 65. Two output fibers 54 and 56 are positioned to receive signals which are split by the splitter cube 68. The output fiber 56 having an end connected to a collimator subassembly 57, receives light passing directly through the interface 66 from the liquid cell 60. The output fiber 54, connected to a collimator subassembly 55 receives light reflected from the interface 66.

Thus the mixer can receive a signal from either one of the input fibers 50 and 52 and can send the signal to either one of the output fibers 54 and 56 by control signals to the liquid crystal cell 60. The mixer can combine signals from the input fibers 50 and 52, and can split signals from the combiner cube 67 under control of the liquid crystal cell 60 with a desired ratio.

For the splitters and combiners described above, without input or output fiber pigtails, the results are very positive. Residual losses have been found to be less than 0.6 dB, and polarization extinction ratios larger than 35 dB for both the S and P components and a polarization dependent losses of less than 0.1 dB are possible. With fiber pigtails, these devices have been found to have residual losses of approximately 0.9 dB, polarization extinction ratios larger than 30 dB and polarization dependent losses of 0.1 dB. Furthermore, a splitting intensity dynamic range has been found to exceed 32 dB over a spectral range of 1200 to 1600 nm.

Figure 4:
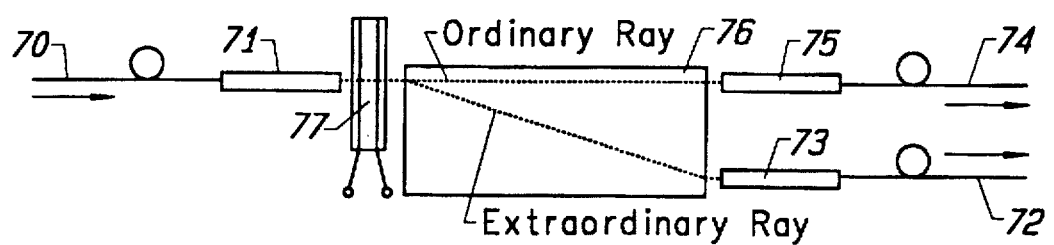
FIG. 4 is a variable polarization beam splitter having a birefringent crystal, according to another embodiment of the present invention.

Alternatively, birefringent crystals and laminated polarization splitters may be used for the beam splitter cubes, such as illustrated in FIG. 1. FIG. 4 illustrates a variable polarization splitter arrangement with a birefringent crystal 76. The arrangement has a collimator subassembly 71 for an input fiber 70. Collimated light from the subassembly 71 is directed toward an liquid crystal cell 77, which can rotate the state of polarization of the light from the subassembly 71 depending upon the voltages upon the control terminals of the cell 77.

The birefringent crystal 76 refracts the light according to the orientation of the light's polarization. Light polarized in the principal plane (which is defined by the optical axis of the crystal 76 and the propagation direction of the light ray) and designated as the extraordinary ray is refracted according to a first index of refraction, $n_e$. Light which is polarized perpendicularly to its principal plane and designated the ordinary ray is refracted by a second index of refraction, $n_o$. The refraction by different indices of refraction separates the differently polarized light as they leave the birefringent crystal, as shown in FIG. 4.

Collimator subassemblies 75 and 73 are connected respectively to output fibers 74 and 72. The subassembly 75 is located to receive the ordinary ray from the birefringent crystal 76 and the subassembly 73 is located to receive the extraordinary ray from the birefringent crystal 76.

Thus the liquid crystal cell 77 can direct the input fiber light into either one of the output fibers 72 and 74 or split the light between the two output fibers in a desired ratio. Note that the collimator subassemblies 73 and 75 for the output fibers 72 and 74 are located parallel to each other, rather than at right angles to each other. A different arrangement of input and output fibers is possible.

Figure 5:
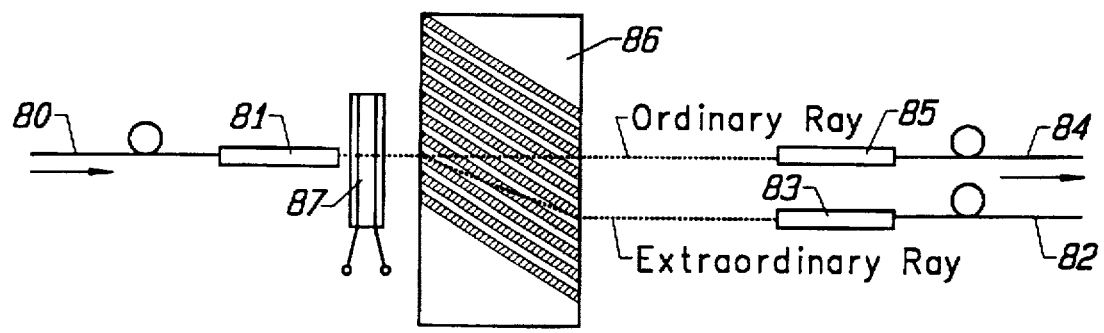
FIG. 5 is a variable polarization beam splitter having a laminated polarization beam splitter plate in place of the birefringent crystal in the beam splitter of FIG. 4.

FIG. 5 illustrates the same arrangement as for FIG. 4, except that the polarization beam splitter is a laminated polarization beam splitter plate 86. Laminated polarization beam splitter plates may be obtained from Sumitomo Cement Co. of Tokyo, Japan.

An improvement can be made in the polarization beam splitter, combiner and mixer arrangements with the use of two liquid crystal cells, instead of one. As described above, the incoming light to a liquid crystal cell should be polarized ±45° from the optical axis of the liquid crystal cell. Thus if the fiber carrying the incoming light is a single mode fiber, not a polarization-maintaining fiber, the polarization of the light should nonetheless be maintained at a 45° angle with respect to the optical axis of the liquid crystal cell. If two liquid crystal cells are located in tandem and operated together, then the requirement of polarization maintenance on a single mode fiber can be eliminated. The two liquid crystals also operate more effectively in rotating the polarization of light than a single liquid crystal cell.

Figure 6:
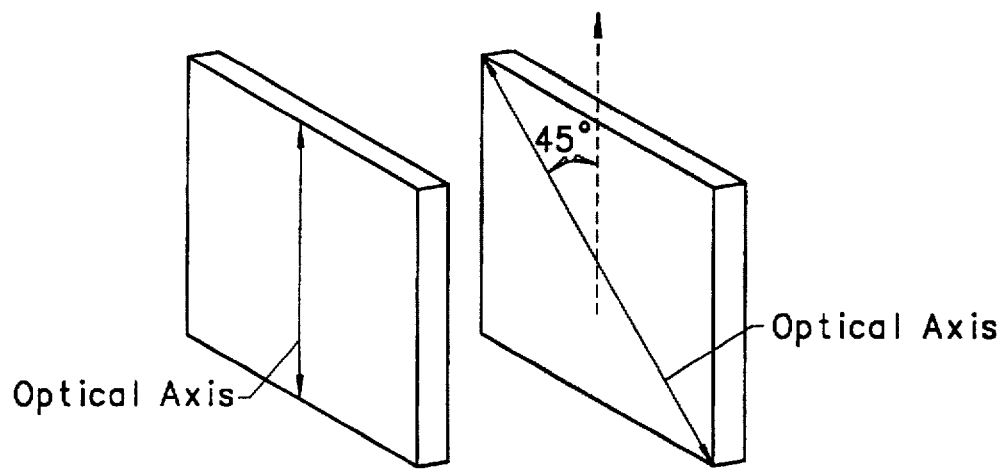
FIG. 6 is a representation of two liquid crystal cells arranged in tandem with the optical axis of each cell aligned at 45° with respect to the other.

The two liquid crystal cells should have their optical axes arranged at 45° with respect to each other, as shown in FIG. 6. Instead of rotating the optical axis of a single liquid crystal cell, the axes of the two liquid crystal cells are rotated together to maintain the 45° angle.

Figure 7:
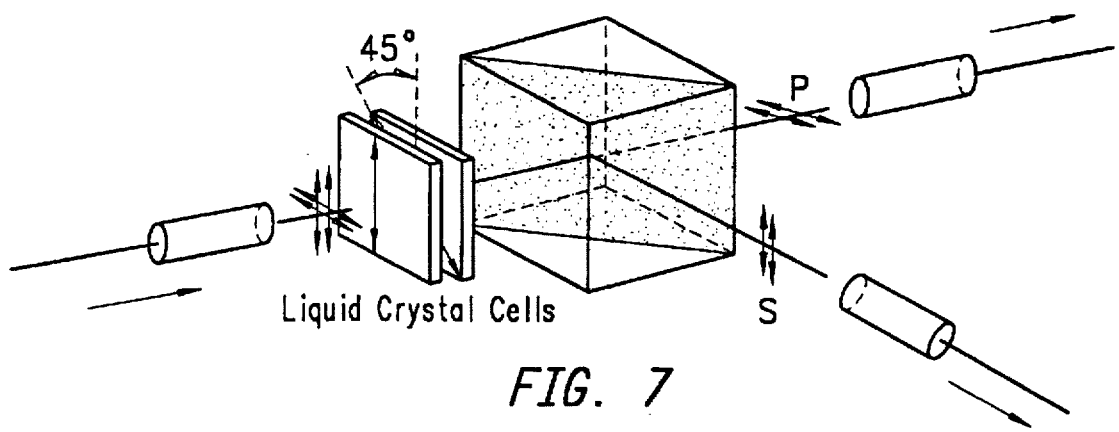
FIG. 7 shows a variable polarization beam splitter like that in FIG. 1, except that two liquid crystal cells, like those in FIG. 6, are used in place of a single liquid crystal cell.
Figure 8:
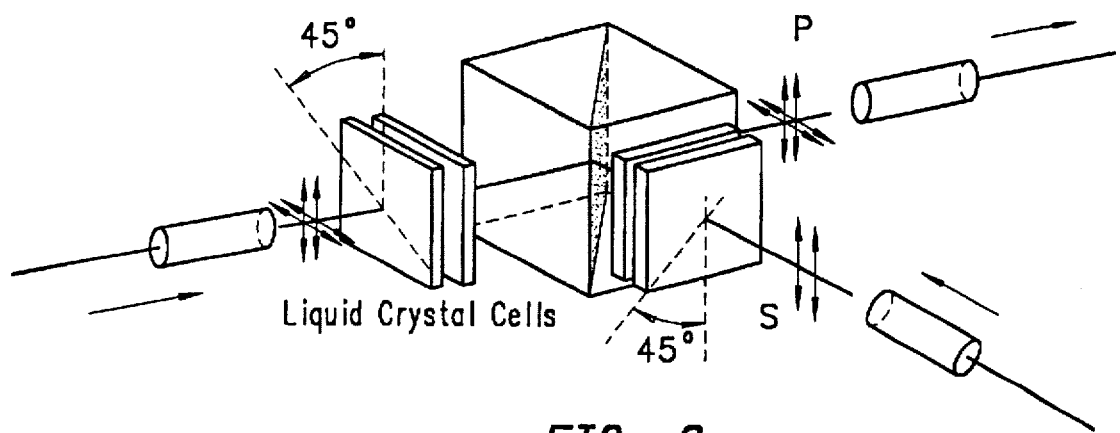
FIG. 8 shows a variable polarization beam combiner like that in FIG. 2, except that two liquid crystal cells, like those in FIG. 6, are used in place of a single liquid crystal cell.
Figure 9:
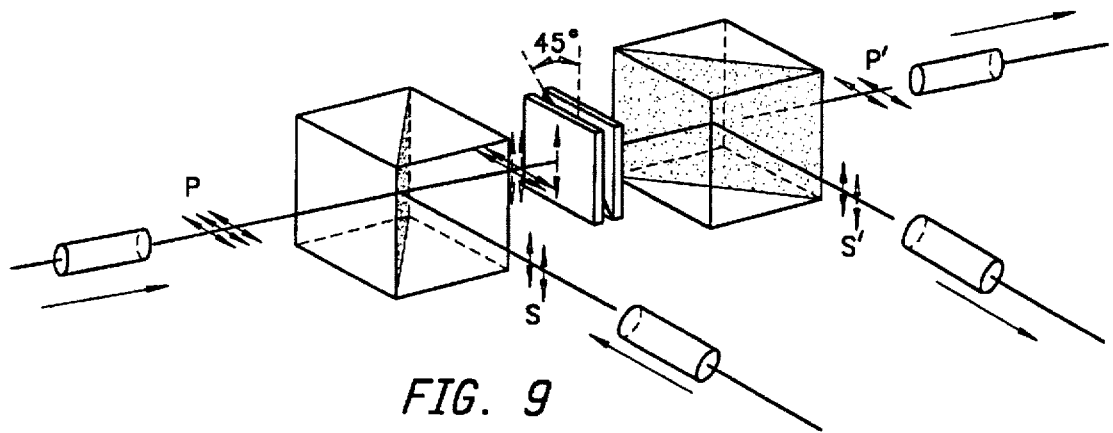
FIG. 9 illustrates a variable polarization beam mixer like that of FIG. 3, except that two liquid crystal cells, like those in FIG. 6, are used in place of a single liquid crystal cell.
Figure 10:
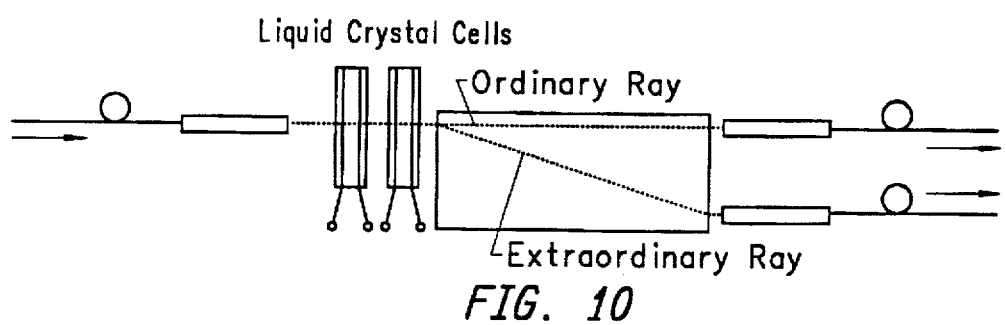
FIG. 10 illustrates a variable polarization beam splitter like that in FIG. 4, except that two liquid crystal cells, like those in FIG. 6, are used in place of a single liquid crystal cell.
Figure 11:
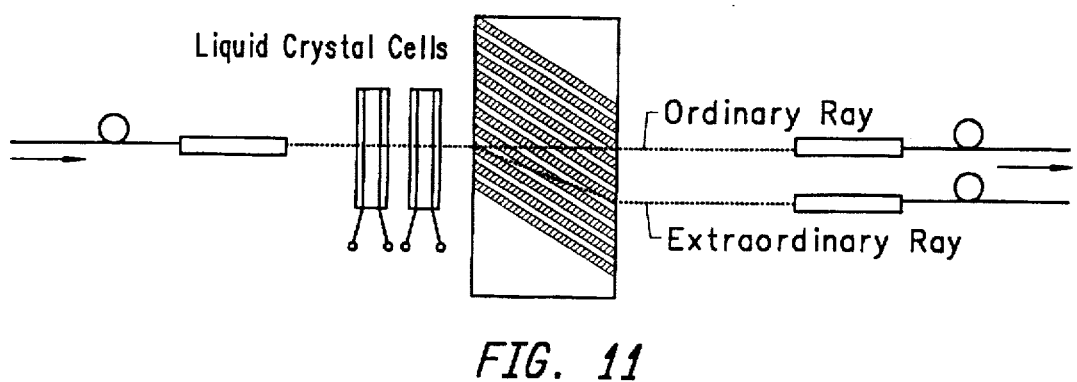
FIG. 11 shows a variable polarization beam splitter like that in FIG. 5, except that two liquid crystal cells, like those in FIG. 6, are used in place of a single liquid crystal cell.

FIGS. 7–12 are equivalents of the arrangements illustrated in FIGS. 1–5, except that the single liquid crystal cell in each arrangement has been replaced by tandem liquid crystal cells. In FIG. 7, the double liquid crystal cell arrangement is very useful if the input optical fiber is a single-mode fiber, rather than a polarization-maintaining fiber. In FIG. 8, the double liquid crystal cells are arranged before each of the input fibers, which are single-mode fibers. In FIG. 9, the double liquid crystal cells effectively control the rotation of the polarization of the light traveling from the beam combiner cube toward the beam splitter cube. Similarly, the double liquid crystal cells in the birefringent crystal polarization beam splitter and laminated polarization beam splitter arrangements in FIGS. 10 and 11 better control the rotation of the polarization of the input light signal.

While the above is a complete description of the preferred embodiments of the present invention, various alternatives, modifications and equivalents may be used. It should be evident that the present invention is equally applicable by making appropriate modifications to the embodiment described above. For example, the arrangement of the polarization beam splitters of FIGS. 4 and 5 can be changed into polarization beam combiners by reversing the functions of the input and output fibers and placing liquid crystal cells in front of each of the collimator subassemblies of the input (formerly output) fibers. Therefore, the above description should not be taken as limiting the scope of invention which is defined by the metes and bounds of the appended claims.

What is claimed is:

1. A variable polarization beam splitter comprising:
   a first collimator subassembly holding an end of a first optical fiber in coaxial relationship with a first collimator;
   a beam splitter in an input light path from the first collimator to direct a first portion of the input light having a first polarization along a first polarization path, and to direct a second portion of the input light having a second polarization along a second polarization path;
   a second collimator subassembly holding an end of a second optical fiber in said first polarization path;
   a third collimator subassembly holding an end of a third optical fiber in said second polarization path; and
   at least one liquid crystal cell interposed between said first collimator subassembly and said beam splitter, said cell controllably rotating the polarization of light from said first collimator subassembly responsive to control signals so that said input light signals from said first optical fiber can be controllably and variably split into said first polarization portion and said second polarization portion.

2. The variable polarization beam splitter of claim 1 wherein said beam splitter comprises first and second prisms, each prism having a hypotenuse face, and first and second faces forming a right angle with each other, said hypotenuse face forming an interface with the other hypotenuse face of the other prism, said first collimator subassembly aligned substantially perpendicularly to a first face of said first prism, said second collimator subassembly aligned substantially perpendicularly to a second face of said first prism, and said third collimator subassembly aligned substantially perpendicularly to a first face of said second prism.

3. The variable polarization beam splitter of claim 1 wherein said beam splitter comprises a birefringent crystal.

4. The variable polarization beam splitter of claim 1 wherein said beam splitter comprises a laminated beam splitter plate.

5. The variable polarization beam splitter of claim 1 wherein said first collimator subassembly comprises a quarter-pitch GRIN lens.

6. The variable polarization beam splitter of claim 1 wherein said second and third collimator subassemblies each comprises a quarter-pitch GRIN lens.

7. A variable polarization beam splitter receiving light signals from a first optical fiber and transmitting light signals to second and third optical fibers, said variable polarization beam splitter comprising
   a first collimator subassembly holding an end of said first optical fiber in coaxial relationship with a first collimator;
   a second collimator subassembly holding an end of said second optical fiber in coaxial relationship with a second collimator;
   a third collimator subassembly holding an end of said third optical fiber in coaxial relationship with a third collimator;
   means for directing light from said first collimator subassembly toward said second collimator subassembly or third collimator subassembly responsive to the polarization of said light signals from said first collimator subassembly; and
   at least one liquid crystal cell interposed between said first collimator subassembly and said directing means, said cell controllably rotating the polarization of light from said first collimator subassembly toward said directing means responsive to control signals;
   wherein two liquid crystal cells are interposed between said first collimator subassembly and said directing means, each of said liquid crystal cells having an optical axis at 45° with respect to the other, said cells controllably rotating the polarization of light from said first collimator subassembly toward said directing means responsive to control signals;
   whereby light signals from said first optical fiber can be controllably variably split into said second and third optical fibers.

8. A variable polarization beam combiner receiving light signals from first and second optical fibers and transmitting light signals to a third optical fiber, said variable polarization beam splitter comprising
   a first collimator subassembly holding an end of said first fiber in coaxial relationship with a first collimator;
   a second collimator subassembly holding an end of said second fiber in coaxial relationship with a second collimator;
   a third collimator subassembly holding an end of said third fiber in coaxial relationship with a third collimator;
   a beam splitter which directs light from said first collimator subassembly toward said third collimator subassembly responsive to the polarization of said light from said first collimator subassembly, and which directs light from said second collimator subassembly toward said third collimator subassembly responsive to the polarization of said light from said second collimator subassembly;
   a first liquid crystal cell interposed between said first collimator subassembly and said beam splitter, said cell controllably rotating the polarization of light from said first collimator subassembly toward said beam splitter responsive to control signals; and
   a second liquid crystal cell interposed between said second collimator subassembly and said beam splitter, said cell controllably rotating the polarization of light from said second collimator subassembly toward said beam splitter responsive to control signals so that light from said first and second optical fibers can be controllably and variably combined into said third optical fiber.

9. The variable polarization beam combiner of claim 8 wherein said beam splitter comprises first and second prisms, each prism having a hypotenuse face, and first and second faces forming a right angle with each other, said hypotenuse face forming an interface with the other hypotenuse face of the other prism, said first collimator subassembly aligned substantially perpendicularly to a first face of said first prism, said second collimator subassembly aligned substantially perpendicularly to a second face of said second prism, and said third collimator subassembly aligned substantially perpendicularly to a first face of said second prism.

10. The variable polarization beam combiner of claim 8 wherein said beam splitter comprises a birefringent crystal.

11. The variable polarization beam combiner of claim 8 wherein said beam splitter comprises a laminated beam splitter plate.

12. The variable polarization beam combiner of claim 8 wherein said first and second collimator subassemblies each comprises a quarter-pitch GRIN lens.

13. The variable polarization beam combiner of claim 8 wherein said third collimator subassembly comprises a quarter-pitch GRIN lens.

14. The variable polarization beam combiner of claim 8 further comprising a third liquid crystal cell interposed between said first liquid crystal cell and said beam splitter, each of said liquid crystal cells having an optical axis at 45° with respect to the other, said cells controllably rotating the polarization of light from said first collimator subassembly toward said beam splitter responsive to control signals.

15. The variable polarization beam combiner of claim 14 further comprising a fourth liquid crystal cell interposed between said second liquid crystal cell and said beam splitter, each of said liquid crystal cells having an optical axis at 45° with respect to the other, said cells controllably rotating the polarization of light from said second collimator subassembly toward said beam splitter responsive to control signals.

16. A variable polarization beam mixer receiving light signals from first and second optical fibers and transmitting light signals to third and fourth optical fibers, said variable polarization beam mixer comprising a first subassembly holding an end of said first fiber in coaxial relationship with a first collimator;

a second subassembly holding an end of said second fiber in coaxial relationship with a second collimator;

a third subassembly holding an end of said third fiber in coaxial relationship with a third collimator;

a fourth subassembly holding an end of said fourth fiber in coaxial relationship with a fourth collimator;

first and second beam splitters, said first beam splitter directing light from said first collimator subassembly toward said second beam splitter responsive to the polarization of said light from said first collimator subassembly, and directing light from said second collimator subassembly toward said second beam splitter responsive to the polarization of said light from said second collimator subassembly;

said second beam splitter directing light from said first beam splitter toward said third collimator subassembly and simultaneously directing light from said first beam splitter toward said fourth collimator subassembly responsive to the polarization of said light signals from said first beam splitter; and at least one liquid crystal cell interposed between said first and second beam splitters, said cell controllably rotating the polarization of light from said first beam splitter toward said second beam splitter responsive to control signals;

whereby light signals from said first and second optical fibers can be controllably and variably split into said third and fourth optical fibers.

17. The variable polarization beam mixer of claim 16 wherein said first beam splitter comprises first and second prisms, each prism having a hypotenuse face, and first and second faces forming a right angle with each other, said hypotenuse face forming an interface with the other hypotenuse face of the other prism, said first collimator subassembly aligned substantially perpendicularly to a first face of said first prism, and said second collimator subassembly aligned substantially perpendicularly to a second face of said second prism, and said second beam splitter aligned substantially perpendicularly to a first face of said second prism.

18. The variable polarization beam mixer of claim 16 wherein said second beam splitter comprises third and fourth prisms, each prism having a hypotenuse face, and first and second faces forming a right angle with each other, said hypotenuse face forming an interface with the other hypotenuse face of the other prism, a first face of said second prism facing and aligned substantially perpendicularly to a first face of said third prism, said third collimator subassembly aligned substantially perpendicularly to a second face of said third prism, and said fourth collimator subassembly aligned substantially perpendicularly to a first face of said fourth prism.

19. The variable polarization beam mixer of claim 16 wherein said first beam splitter comprises a birefringent crystal.

20. The variable polarization beam mixer of claim 16 wherein said second beam splitter comprises a birefringent crystal.

21. The variable polarization beam mixer of claim 16 wherein said first beam splitter comprises a laminated beam splitter plate.

22. The variable polarization beam mixer of claim 16 wherein said second beam splitter comprises a laminated beam splitter plate.

23. The variable polarization beam mixer of claim 16 wherein said first, second, third and fourth collimator subassembly each comprises a quarter-pitch GRIN lens.

24. The variable polarization beam mixer of claim 16 wherein two liquid crystal cells are interposed between said first beam splitter and said second beam splitter, each of said liquid crystal cells having an optical axis at 45° with respect to the other, said cells controllably rotating the polarization of light from said first beam splitter toward said second beam splitter responsive to control signals.

* * * * *